Figure 1:
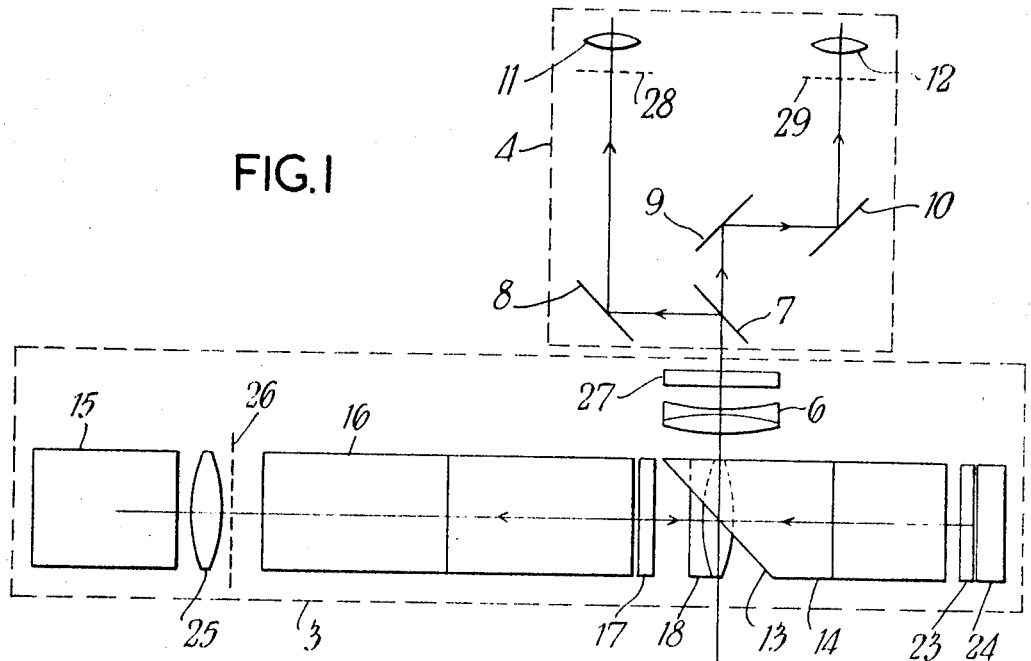

United States Patent
Smith

[15] 3,652,167
[45] Mar. 28, 1972

[54] OPTICAL IMAGE SPLITTING SYSTEMS

[72] Inventor: Francis Hughes Smith, York, England
[73] Assignee: Vickers Limited, London, England
[22] Filed: Apr. 28, 1970
[21] Appl. No.: 32,543

[30] Foreign Application Priority Data

Apr. 30, 1969  Great Britain......................22,127/69

[52] U.S. Cl..............................356/163, 350/33, 350/35, 350/45, 350/173
[51] Int. Cl...........................................................G01b 11/02
[58] Field of Search ................356/163, 156; 350/35, 45, 50, 350/52, 171–174, 33

[56] References Cited

UNITED STATES PATENTS

| | | | |
|---|---|---|---|
| 1,564,418 | 12/1925 | Konig | 350/45 |
| 3,068,743 | 12/1962 | Dyson | 356/163 |
| 3,288,021 | 11/1966 | Hopkins | 356/163 |
| 3,326,079 | 6/1967 | Dyson et al. | 356/163 |
| 3,586,447 | 6/1971 | Vollmer | 356/163 |

*Primary Examiner*—Ronald L. Wibert
*Assistant Examiner*—J. Rothenberg
*Attorney*—Pennie, Edmonds, Morton, Taylor and Adams

[57] ABSTRACT

In a binocular optical sizing instrument, an adjustable image-splitting device is arranged, between an objective and the binocular viewing head, for use in measuring the diameters of viewed objects by the image-splitting method. The objective is arranged to form a primary real image of the field of view upstream of the common focal plane of the eyepieces of the binocular viewing head, and optical imaging means are positioned downstream of the primary real image to focus the field of view onto the said common focal plane. The optical system of the instrument is also arranged to form a real image of the objective's exit pupil at a point optically equivalent to the apparent image-splitting point of the device.

Such an image-splitting device can also be used in a monocular sizing instrument.

25 Claims, 2 Drawing Figures

Inventor
Francis Hughes Smith

OPTICAL IMAGE SPLITTING SYSTEMS

This invention relates to optical image-splitting systems.

The diameter of a very small object can be measured by means of a microscope having an image-splitting device between its eyepiece and its objective. One such image-splitting device comprises a collimator and a group of plane reflectors, constituted by respective surfaces of two prisms, mounted in an adjustable spatial relationship with one another (one of the prisms being rotatable with respect to the other) upstream of the eyepiece but downstream of the collimator (by "upstream" is meant optically before, and by "downstream" is meant optically after). When this image-splitting device is in use the group of plane reflectors splits a primary beam of light, bearing an image of the field of view (including the said object) of the microscope, into two parallel secondary beams which are separated from one another by a distance which is selectively variable by adjustment of the said spatial relationship (i.e. by relative rotation of the prisms). The two secondary beams are brought to a focus in the focal plane of the eyepiece and accordingly two intermediate images of the object are formed in the said focal plane. By adjustment of the said spatial relationship, the two intermediate images of the object are caused to move across each other until they are just touching one another edge-to-edge, with no overlap, when a calibrated micrometer scale linked with the adjusted reflector surfaces (i.e. with the prisms) indicates the diameter being measured.

The collimator is provided in the aforesaid image-splitting device in order to collimate the objective's exit pupil (the exit pupil of an optical system is an image of the limiting aperture stop of the system formed by that part of the system which is on the image side of the aperture stop). This is necessary in order to minimize splitting of the exit pupil, by the image-splitting device, in a case such as this wherein the said two secondary beams are parallel to one another immediately downstream of the said group of plane reflectors. In general, in order to minimize exit pupil splitting, a real image of the exit pupil (of the objective) should be formed at the point from which the two secondary beams appear, immediately downstream of the said group of plane reflectors, to be mutually divergent. The aforesaid case wherein the two secondary beams are parallel is a limiting case in which they may be regarded as being mutually divergent from a point at infinity; accordingly the said collimator is used to provide the corresponding limiting case in which a "real" image of the objective's exit pupil is formed also at the said point at infinity. Exit pupil splitting is an effect which can introduce measuring errors and make an affected instrument difficult to use due to fluctuations of the relative brightness of the two images seen by an observer when his pupil scans across the images observed. This is because, near the limits of such scanning, the observer's pupil becomes cut off from overlapping light beams, associated respectively with the split exit pupils, successively rather than simultaneously, and so the two images observed appear to flicker. If there is no exit pupil splitting, there is no such apparent flickering.

In a binocular microscope it has not proved practicable to insert such an image-splitting device between a conventional binocular viewing head and the objective that would conventionally be used with that head, because the size of the binocular head, which includes not only the two eyepieces but also a conventional beam divider therefor, is so great that not enough space is left between the head and the objective to permit such insertion. However, it is widely recognized that binocular viewing is less tiring than monocular viewing for prolonged routine microscopy, and accordingly it is desirable to provide an optical image-splitting system which may be used with binocular viewing.

According to the present invention there is provided an optical instrument of the kind having an objective, an eyepeice for viewing intermediate real images, of fields of view under investigation, formed at a focal plane thereof by means of the objective, and an image-splitting device arranged between the objective and the eyepiece and comprising a group of plane reflectors mounted in an adjustable spatial relationship with one another for splitting a primary light beam, received from the objective, into two secondary image-bearing beams which, downstream of the said group, are spaced from one another by a distance which is selectively variable by adjustment of the said spatial relationship, wherein a primary real image of the field of view is formed by the said objective at a first position downstream of the objective, first optical imaging means are mounted downstream of the objective, but upstream of the said group, for forming a real image of the objective's exit pupil at a point optically equivalent to a point from which the said two secondary beams appear, immediately downstream of the said group, to be mutually divergent, and second optical imaging means are mounted downstream of the said group and the said first position, but upstream of the said focal plane, for bringing to a focus at the focal plane the images of the field of view that are borne respectively by the said two secondary beams.

In an instrument embodying the present invention, there are two successive real images, of the field of view, in the objective-to-eyepiece space, as opposed to the hitherto conventional one. By this means the optical objective-to-eyepiece distance is increased to an extent sufficient to permit of the use of image-splitting techniques in a binocular microscope.

Figure 2:
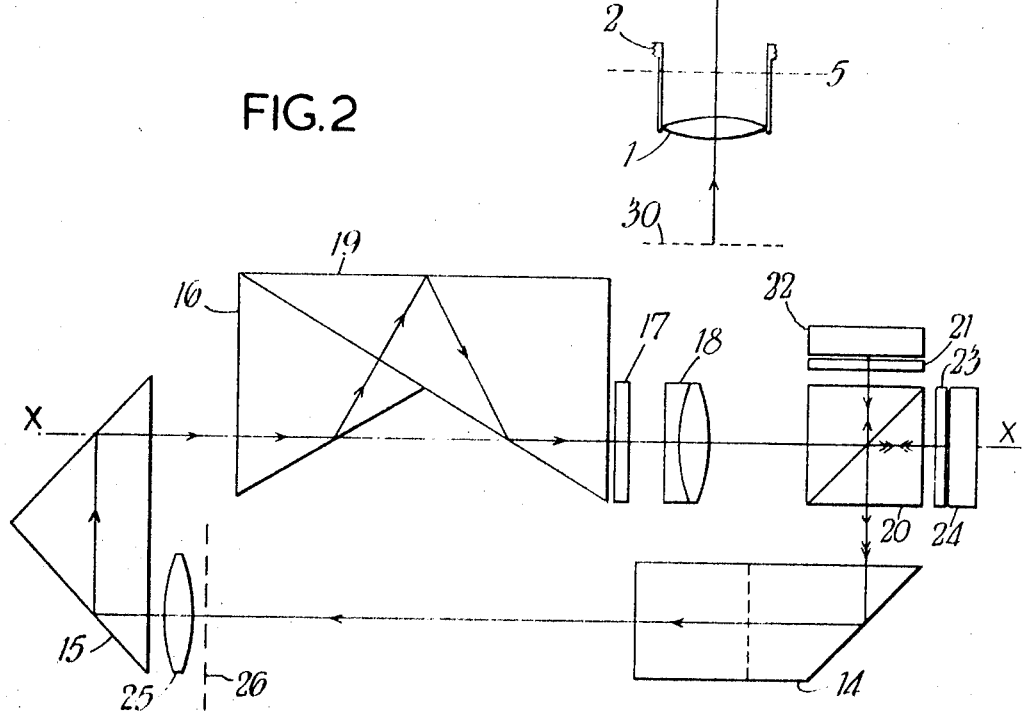

For a better understanding of the invention, and to show how the same may be carried into effect, reference will now be made, by way of example, to the accompanying drawing in which:

FIG. 1 shows diagrammatically an elevation of the optical system of a binocular microscope embodying the present invention, and FIG. 2 shows a diagrammatic plan view of a part of the system of FIG. 1.

FIG. 1 shows a binocular microscope comprising a conventional objective 1, an image splitting device 3 and a conventional binocular viewing head 4. The objective 1 is shown in a very simplified manner: the objective 1 would of course normally be a compound lens. The objective 1 has a standard Royal Microscopical Society mounting thread 2, and the exit pupil of the objective is at 5.

The binocular viewing head 4 comprises the conventional arrangement of a beam divider made up of an interface 7 which transmits and reflects with equal intensities and three reflecting surfaces 8, 9 and 10, and two eyepieces 11 and 12. The eyepiece 11 has a focal plane 28 and the eyepiece 12 has a focal plane 29. These focal planes are coincident, so that the eyepieces have a common focal plane 28/29. Like the objective 1, the eyepieces 11 and 12 are shown in a very simplified manner and would in fact normally be compound lenses.

In summary, when the microscope shown in FIG. 1 is in use, a primary beam bearing an image of a field of view 30 passes vertically upwards through the objective 1 to an underside of a metallized surface 13, of a prism 14, which reflects the beam into a horizontal looped path in which the beam is divided into two secondary beams as described below, the looped path terminating at the upper side of the surface 13 whereby the two secondary beams are discharged vertically into the binocular viewing head 4.

An effect of the objective on the primary beam is to focus the field of view at a point along the horizontal looped path thereby to form a primary orthoscopic image of the field of view in a plane 26 in the vicinity of a field lens 25. The effect of the field lens is to cause the orthoscopic image to converge as it passes through a Porro prism 15, a K-prism 16 and a quarter-wave retardation plate 17 until it reaches a field collimator 18, which collimates the orthoscopic image. The K-prism is a cemented assembly which has a metallized face 19 (FIG. 2) and which is mounted so as to be manually rotatable through 90° about the axis X—X shown in FIG. 2 between the position shown in FIG. 2 and a position in which the metallized face 19 occupies a horizontal plane vertically below the axis X—X.

Having passed through the field collimator 18, the primary beam enters a Swan cube 20 (FIG. 2). At the plane interface of the Swan cube the beam is divided into the two secondary beams, one reflected and the other transmitted. The reflected beam (marked with a single arrow) passes from the cube through a quarter-wave retardation plate 21 and encounters a plane front surface mirror 22 which reflects the beam back through the plate 21 to the Swan cube interface which then finally transmits the beam out of the Swan cube. The transmitted beam (marked with a double arrow) passes from the cube through a quarter-wave retardation plate 23 and encounters a plane front surface mirror 24 which reflects the beam back through the plate 23 to the interface which then finally reflects the beam out of the Swan cube. The reflecting surfaces of the mirrors 22 and 24 lie in vertical planes inclined at right angles to one another. The interface of the Swan cube also lies in a vertical plane. Thus, the plane of the Swan cube interface intersects the planes of the reflecting surfaces of the mirrors 22 and 24 in two lines which are parallel to one another. The Swan cube is rotatable manually, by micrometer-controlled mounting means (not shown) which may be of conventional type, relative to the mirrors 22 and 24 about a vertical axis which intersects the horizontal looped path at a central point of the Swan cube interface. The two mirrors are equidistant from the point of intersection. With the Swan cube in the illustrated orientation, with respect to the mirrors 22 and 24, the transmitted beam and the reflected beam recombine at the interface and there is no image splitting. However, if the Swan cube is rotated through a small angle about its axis of rotation the transmitted beam and the reflected beam do not recombine at the interface and, on finally leaving the Swan cube, the two secondary beams are spaced from one another and appear, immediately downstream of the Swan cube, to be mutually divergent from the reflecting surface of the mirror 22 (by saying that the two secondary beams are "spaced" from one another, it is meant that the central axes of the two beams are spaced from one another). The angle by which the two secondary beams diverge from one another depends on the angle through which the Swan cube is rotated from its illustrated orientation.

The secondary beams leaving the Swan cube encounter a vertical reflecting face of the prism 14 whereby the beams are reflected to the upper side of the metallized surface 13, which reflects the beams into a vertical plane. The vertically travelling beams pass through a telescope objective 6 and a thick quartz plate 27 before entering the binocular viewing head 4. The telescope objective 6 focuses the collimated images of the field of view into the common focal plane 28/29 of the two eyepieces 11 and 12 so that secondary real images are formed in that plane. These images are viewed through the eyepieces in conventional manner, and the image-splitting method of measuring the diameter of an object in the field of view can accordingly be employed, the aforesaid micrometer controlled mounting means being appropriately calibrated in conventional manner.

In addition, the exit pupil of the microscope objective 1 serves as an object for the field lens 25 which converges the image of the exit pupil towards a position beyond the mirror 24. The field collimator converges the exit pupil further, to bring it to a focus at the reflecting surface of the mirror 24. By virtue of the fact that the interface of the Swan cube is partly reflecting, the reflecting surface of the mirror 24 is in an optically equivalent position to that of the reflecting surface of the mirror 22 and accordingly the exit pupil is really imaged by the lens 25 and the field collimator 18 at a point that is optically equivalent to the point from which the two secondary beams appear, immediately downstream of the Swan cube, to be mutually divergent. By virtue of the fact that the image of the exit pupil is a point optically equivalent to that from which the two secondary beams appear to be mutually divergent there is no exit pupil splitting.

The function of the three quarter-wave retardation plates 17, 21 and 23 is to enchance the light transmission and reduce veiling glare due to air-glass reflections. Oblique incidence at the partially reflecting interface of the Swan cube 20 gives rise to strong polarization. For example the beam which is initially reflected by the interface leaves the cube with its strongest electrical vibration perpendicular to the plane of incidence on the interface. In order to ensure maximum transmission when this beam returns through the interface, its outgoing vibration direction is rotated through 90° by virtue of double transmission through the quarter-wave plate 20, which is diagonally oriented. The beam which is initially transmitted by the interfaces leaves the cube with its strongest electrical vibration in the plane of incidence on the interface and in order to ensure maximum reflection when this beam returns to the interface, its outgoing vibration direction is rotated through 90° by virtue of double transmission through the quarter-wave plate 23, which is also diagonally oriented. The purpose of the plate 17 is to ensure that the secondary beams transmitted and reflected by the interface have equal amplitude regardless of the state of polarization of the primary beam. The plate 17 is also diagonally oriented and so circularly polarizes components of the primary beam polarized in and perpendicular to the plane of incidence at the interface of the cube. The thick quartz plate 27 is required because the two secondary beams leave the Swan cube partially polarized in mutually perpendicular planes and the beam-splitting interface 7 exerts a partial analyzing action on the two secondary beams so that without the plate 27 the two secondary beams would be transmitted and reflected by the interface 7 with different intensities. Such difference of intensities impairs the accuracy of settings made on rotating the Swan cube and the plate 27 is provided to mitigate this effect. Ideally, the plate 27 circularly polarizes the two secondary beams so that they are transmitted and reflected by the interface 7 with equal intensities. A further quarter-wave retardation plate may be used instead of the thick quartz plate 27.

The image-splitting device 3 may conveniently be constructed in the form of a module interposed between the objective and the viewing head of a binocular microscope. The module could be used with different objectives, each positioned as nearly as is practicable with its exit pupil at the preselected position 5 in relation to the module 3. A useful degree of avoidance of exit-pupil splitting may be obtained even if the exit pupil of a particular objective cannot be placed precisely at the position 5. Thus the module could usefully be marketed as a separate item, for use in conjunction with binocular viewing heads and objectives already available.

Such a module may in fact also be used with a monocular viewing head, but in such a case the thick quartz plate 27 (or the alternative further quarter-wave plate) would not be required.

In the device 3 the Swan cube is rotatable about a vertical axis with respect to the rest of the device. Alternatively, a device could be constructed in which the Swan cube remains stationary while the two front surface mirrors are rotated together about a vertical axis. In such a case the two component beams again emerge from the Swan cube at a relative inclination dependent upon the inclination of the interface of the Swan cube with respect to the front surface mirrors.

The provision of the rotable K-prism in the illustrated arrangement is not an essential feature if the microscope has a conventional rotating stage, but it is a strongly preferred feature because by rotation of the K-prism the secondary real images viewed through the eyepiece can be rotated about one another, permitting different diameters of an object in the field of view to be measured without touching the object itself.

I claim:

1. An optical sizing instrument of the kind comprising an objective and a binocular viewing head having a beam divider and two eyepieces for viewing respective intermediate real images, of a field of view under investigation, formed at a common focal plane thereof by means of the objective, wherein the improvement resides in that:

i. an image-splitting device comprising a group of plane reflectors mounted in an adjustable spatial relationship with one another is arranged between the objective and the binocular viewing head for splitting a primary light beam, received from the objective, into two secondary image-bearing beams which, downstream of the said group, are spaced from one another by a distance which is selectively variable by adjustment of the said spatial relationship;

ii. the objective is arranged to form a primary real image, of the field of view, at a first position upstream of the said common focal plane;

iii. first optical imaging means are mounted downstream of the objective, but upstream of the said group, for forming a real image of the objective's exit pupil at a point optically equivalent to a point from which the said two secondary beams appear, immediately downstream of the said group, to be mutually divergent; and iv. second optical imaging means are mounted downstream of the said group and the said first position, but upstream of the said common focal plane, for bringing to a focus at the common focal plane the images of the field of view that are borne respectively by the said two secondary beams.

2. An instrument according to claim 1, comprising prism means mounted upstream of the said group for rotation about the primary beam so as to rotate the images formed in the said common focal plane from the two secondary beams.

3. For use in an optical sizing instrument of the kind comprising an objective and a binocular viewing head having a beam divider and two eyepieces for viewing respective intermediate real images of a field of view, formed at a common focal plane thereof by means of the objective, a module adapted to be arranged between the objective and the binocular viewing head and comprising:

i. an image-splitting device comprising a group of plane reflectors mounted in an adjustable spatial relationship with one another for splitting a primary light beam, received from the objective, into two secondary image-bearing beams which, downstream of the said group, are spaced from one another by a distance which is selectively variable by adjustment of the said spatial relationship;

ii. first optical imaging means mounted upstream of the said group, for forming a real image of the objective's exit pupil at a point optically equivalent to a point from which the said two secondary beams appear, immediately downstream of the said group, to be mutually divergent; and iii. second optical imaging means mounted down stream of the said group for bringing to a focus at the said common focal plane the images of the field of view that are borne respectively by the said two secondary beams.

4. An instrument according to claim 1, wherein the group of plane reflectors comprises means presenting a plane partially-reflecting interface to the primary beam, and first and second plane reflectors which are fixedly positioned relative to one another with their planes intersecting the plane of said partially-reflecting interface in respective parallel lines and which face towards said partially-reflecting interface and which are mounted for rotation relative to said partially-reflecting interface about an axis that is perpendicular to the primary beam immediately upstream of the said group and lies in the plane of said interface and is parallel to said respective parallel lines.

5. An instrument according to claim 4, wherein the planes of the first and second reflectors are perpendicular to one another.

6. An instrument according to claim 4, wherein said first and second plane reflectors comprise respective plane front surface mirrors.

7. An instrument according to claim 4, wherein the planes of the first and second reflectors are equidistant from the said axis.

8. An instrument according to claim 4, wherein the means presenting said plane partially-reflecting interface to the primary beam comprise a Swan cube.

9. An instrument according to claim 1, wherein the two secondary beams appear, immediately downstream of the said group, to be mutually divergent from a point at a finite distance from the second optical imaging means, and the first optical imaging means comprise a field lens and a field collimator, said field collimator being mounted downstream of the field lens but upstream of the said group.

10. An instrument according to claim 1, wherein the two secondary beams appear, immediately downstream of the said group, to be mutually divergent from a point at a finite distance from the second optical imaging means, and the first optical imaging means comprise a field lens and a field collimator mounted downstream of the field lens but upstream of the said group, the said first position being upstream of the said group and the field lens and the field collimator serving in combination to collimate the primary real image.

11. An instrument according to claim 10, wherein the image-splitting device, the first optical imaging means and the second optical imaging means are parts of an exchangeable module mounted in the instrument between the objective and the binocular viewing head.

12. An instrument according to claim 11, wherein the exchangeable module further includes prism means mounted upstream of the said group, but downstream of the field lens, for rotation about the primary beam so as to rotate the images formed in the said common focal plane from the two secondary beams.

13. An instrument according to claim 1, wherein the group of plane reflectors comprises means presenting a plane partially-reflecting interface mounted for splitting said primary beam into a reflected beam and a transmitted beam, and first and second reflection devices, each having at least one plane reflecting surface, arranged for receiving said reflected beam and said transmitted beam respectively and returning them to said interface whereat they are transmitted and reflected respectively, the two reflection devices being fixed relative to one another and being mounted for rotation relative to said partially-reflecting interface about an axis that is perpendicular to the primary beam immediately upstream of said group and lies in the plane of said interface.

14. A module according to claim 3, wherein the group of plane reflectors comprises first and second plane reflectors and means presenting a plane partially-reflecting interface to the primary beam, the first and second plane reflectors being fixed with respect to one another and facing the plane partially-reflecting interface, the plane of said interface intercepting the planes of the first and second reflectors in respective parallel lines, and the means presenting the partially-reflecting interface being mounted for rotation with respect to the first and second reflectors about an axis that is perpendicular to the primary beam immediately upstream of the said group and which lies in the plane of the interface parallel to the said parallel lines.

15. A module according to claim 14, wherein the first and second plane reflectors constitute respective plane front surface mirrors mounted at right angles to one another.

16. A module according to claim 14, wherein the planes of the first and second reflectors are equidistant from the said axis.

17. A module according to claim 14, wherein the means presenting said plane partially-reflecting interface to the primary beam comprise a Swan cube.

18. A module according to claim 3, wherein the two secondary beams appear, immediately downstream of the said group, to be mutually divergent from a point at a finite distance from the second optical imaging means, and the first optical imaging means comprise a field lens and a field collimator, said field collimator being mounted downstream of the field lens but upstream of the said group.

19. An optical sizing instrument of the kind comprising an objective and eyepiece means for viewing a field of view under investigation imaged by means of the objective at a focal plane of the eyepiece means, wherein the improvement resides in that:
i. an image-splitting device comprising a group of plane reflectors mounted in an adjustable spatial relationship with one another is arranged between the objective and the eyepiece means for splitting a primary light beam, received from the objective, into two secondary image-bearing beams which, downstream of the said group, are spaced from one another by a distance which is selectively variable by adjustment of the said spatial relationship;
ii. the objective is arranged to form a primary real image, of the field of view, at a first position upstream of the said focal plane;
iii. first optical imaging means are mounted downstream of the objective, but upstream of the said group, for forming a real image of the objective's exit pupil at a point optically equivalent to a point from which the said two secondary beams appear, immediately downstream of the said group, to be mutually divergent; and
iv. second optical imaging means are mounted downstream of the said group and the said first position, but upstream of the said focal plane, for bringing to a focus at the said focal plane the images of the field of view that are borne respectively by the said two secondary beams.

20. An instrument according to claim 19, comprising prism means mounted upstream of the said group for rotation about the primary beam so as to rotate the images formed in the said focal plane from the two secondary beams.

21. An instrument according to claim 19, wherein the group of plane reflectors comprises means presenting a plane partially-reflecting interface to the primary beam, and first and second plane reflectors which are fixedly positioned relative to one another with their planes intersecting the plane of said partially-reflecting interface in respective parallel lines and which face towards said partially-reflecting interface and which are mounted for rotation relative to said partially-reflecting interface about an axis that is perpendicular to the primary beam immediately upstream of the said group and lies in the plane of said interface and is parallel to said respective parallel lines.

22. An instrument according to claim 21, wherein the first and second reflectors comprise respective plane front surface mirrors mounted at right angles to one another.

23. For use in an optical sizing instrument of the kind comprising an objective and eyepiece means for viewing a field of view imaged by means of the objective at a focal plane of the eyepiece means, a module adapted to be arranged between the objective and the eyepiece means and comprising:
i. an image-splitting device comprising a group of plane reflectors mounted in an adjustable spatial relationship with one another for splitting a primary light beam, received from the objective, into two secondary image-bearing beams which, downstream of the said group, are spaced from one another by a distance which is selectively variable by adjustment of the said spatial relationship;
ii. first optical imaging means mounted upstream of the said group, for forming a real image of the objective's exit pupil at a point optically equivalent to a point from which the said two secondary beams appear, immediately downstream of the said group, to be mutually divergent; and
iii. second optical imaging means mounted downstream of the said group for bringing to a focus at the said focal plane the images of the field of view that are borne respectively by the said two secondary beams.

24. A module according to claim 23, wherein the group of plane reflectors comprises means presenting a plane partially-reflecting interface to the primary beam, and first and second plane reflectors which are fixedly positioned relative to one another with their planes intersecting the plane of said-partially-reflecting interface in respective parallel lines and which face towards said partially-reflecting interface and which are mounted for rotation relative to said partially-reflecting interface about an axis that is perpendicular to the primary beam immediately upstream of the said group and lies in the plane of said interface and is parallel to said respective parallel lines.

25. A module according to claim 24, wherein the first and second reflectors comprise respective plane front surface mirrors fixed at right angles to one another.

* * * * *